(12) United States Patent
Alahyari et al.

(10) Patent No.: US 11,959,641 B2
(45) Date of Patent: Apr. 16, 2024

(54) COMBUSTOR SHELL WITH SHAPED IMPINGEMENT HOLES

(71) Applicant: RTX Corporation, Farmington, CT (US)

(72) Inventors: Abbas A. Alahyari, Glastonbury, CT (US); Yasmin Khakpour, South Windsor, CT (US); Miad Yazdani, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 16/778,373

(22) Filed: Jan. 31, 2020

(65) Prior Publication Data

US 2021/0239320 A1 Aug. 5, 2021

(51) Int. Cl.
F23R 3/00 (2006.01)
(52) U.S. Cl.
CPC ........ *F23R 3/002* (2013.01); *F05D 2260/201* (2013.01); *F23R 2900/03044* (2013.01)
(58) Field of Classification Search
CPC .......................................... F23R 2900/03044
See application file for complete search history.

(56) References Cited

U.S. PATENT DOCUMENTS

| 7,052,233 | B2 | 5/2006 | Fied et al. |
| 7,926,278 | B2 | 4/2011 | Gerendas et al. |
| 2005/0022531 | A1* | 2/2005 | Burd ....................... F23R 3/002 60/752 |
| 2009/0308077 | A1* | 12/2009 | Shelley ..................... F23R 3/06 60/752 |
| 2013/0156549 | A1* | 6/2013 | Maldonado ............. F01D 9/041 415/115 |
| 2013/0209236 | A1 | 8/2013 | Xu |
| 2014/0238028 | A1* | 8/2014 | Yamane .................... F23R 3/06 60/752 |
| 2014/0290258 | A1 | 10/2014 | Gerendas et al. |
| 2017/0101932 | A1* | 4/2017 | Stover ..................... F01D 11/08 |
| 2017/0343217 | A1 | 11/2017 | Chen et al. |
| 2018/0128177 | A1 | 5/2018 | Holland et al. |
| 2018/0320898 | A1* | 11/2018 | Uhm ....................... F23R 3/002 |

(Continued)

OTHER PUBLICATIONS

The Extended European Search Report for Application No. 21154373.1-1009; dated Jun. 16, 2021; 7 pages.

(Continued)

*Primary Examiner* — Gerald L Sung
*Assistant Examiner* — Alyson Joan Harrington
(74) *Attorney, Agent, or Firm* — CANTOR COLBURN LLP

(57) ABSTRACT

A combustor for use in a gas turbine engine including a heat shield panel having a first surface and a second surface opposite the first surface of the heat shield panel and a combustor shell having an inner surface and an outer surface opposite the inner surface. The inner surface of the combustor shell and the second surface of the heat shield panel being in a facing spaced relationship defining an impingement cavity therebetween. The combustor shell further includes an impingement aperture that has a nonaxisymmetric shape. The impingement aperture extending from the outer surface to the inner surface through the combustor shell.

2 Claims, 5 Drawing Sheets

(56) References Cited

U.S. PATENT DOCUMENTS

2019/0169998 A1* 6/2019 Whitfield ............... F01D 5/187
2019/0277501 A1 9/2019 Xu

OTHER PUBLICATIONS

Communication Pursuant to Article 94(3) EPC dated Dec. 19, 2022; EP Application No. 21154373.1; 5 pages.
European Search Report for Application No. 21154373.1; Issued Nov. 10, 2023.

* cited by examiner

COMBUSTOR SHELL WITH SHAPED IMPINGEMENT HOLES

BACKGROUND

The subject matter disclosed herein generally relates to gas turbine engines and, more particularly, to a method and apparatus for mitigating heat in cooling surfaces of gas turbine engines.

In one example, a combustor of a gas turbine engine may be configured to burn fuel in a combustion area. Such configurations may place substantial heat load on the structure of the combustor (e.g., heat shield panels, combustor shells, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields panels.

SUMMARY

According to an embodiment, a combustor for use in a gas turbine engine is provided. The combustor includes a heat shield panel having a first surface and a second surface opposite the first surface of the heat shield panel and a combustor shell having an inner surface and an outer surface opposite the inner surface. The inner surface of the combustor shell and the second surface of the heat shield panel being in a facing spaced relationship defining an impingement cavity therebetween. The combustor shell further includes an impingement aperture that has a nonaxisymmetric shape. The impingement aperture extending from the outer surface to the inner surface through the combustor shell.

In addition to one or more of the features described above, or as an alternative, further embodiments may include that the nonaxisymmetric shape of the impingement aperture extends from the outer surface to the inner surface through the combustor shell.

In addition to one or more of the features described above, or as an alternative, further embodiments may include that the impingement aperture has only one wall that forms the impingement aperture by extending from the outer surface to the inner surface through the combustor shell.

In addition to one or more of the features described above, or as an alternative, further embodiments may include that the impingement aperture has two or more walls that forms the impingement aperture by extending from the outer surface to the inner surface through the combustor shell.

In addition to one or more of the features described above, or as an alternative, further embodiments may include that the impingement aperture is crescent-shaped.

In addition to one or more of the features described above, or as an alternative, further embodiments may include that the impingement aperture is star-shaped.

In addition to one or more of the features described above, or as an alternative, further embodiments may include that the impingement aperture is comma-shaped.

In addition to one or more of the features described above, or as an alternative, further embodiments may include that the impingement aperture is oval-shaped.

In addition to one or more of the features described above, or as an alternative, further embodiments may include that the nonaxisymmetric shape of the impingement aperture is composed of two or more intersecting shapes.

In addition to one or more of the features described above, or as an alternative, further embodiments may include that the two or more intersecting shapes are circles.

In addition to one or more of the features described above, or as an alternative, further embodiments may include that the two or more intersecting shapes are aligned in an arc.

According to another embodiment, a gas turbine engine is provided. The gas turbine engine including a combustor section and a combustor housed within the combustor section. The combustor including: a heat shield panel having a first surface and a second surface opposite the first surface of the heat shield panel and a combustor shell having an inner surface and an outer surface opposite the inner surface. The inner surface of the combustor shell and the second surface of the heat shield panel being in a facing spaced relationship defining an impingement cavity therebetween. The combustor shell further includes an impingement aperture that has a nonaxisymmetric shape. The impingement aperture extending from the outer surface to the inner surface through the combustor shell.

In addition to one or more of the features described above, or as an alternative, further embodiments may include that the nonaxisymmetric shape of the impingement aperture extends from the outer surface to the inner surface through the combustor shell.

In addition to one or more of the features described above, or as an alternative, further embodiments may include that the impingement aperture has only one wall that forms the impingement aperture by extending from the outer surface to the inner surface through the combustor shell.

In addition to one or more of the features described above, or as an alternative, further embodiments may include that the impingement aperture has two or more walls that form the impingement aperture by extending from the outer surface to the inner surface through the combustor shell.

In addition to one or more of the features described above, or as an alternative, further embodiments may include that the impingement aperture is crescent-shaped.

In addition to one or more of the features described above, or as an alternative, further embodiments may include that the impingement aperture is star-shaped.

In addition to one or more of the features described above, or as an alternative, further embodiments may include that the impingement aperture is comma-shaped.

In addition to one or more of the features described above, or as an alternative, further embodiments may include that the impingement aperture is oval-shaped.

In addition to one or more of the features described above, or as an alternative, further embodiments may include that the nonaxisymmetric shape of the impingement aperture is composed of two or more intersecting shapes.

The foregoing features and elements may be combined in any of the various possible combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
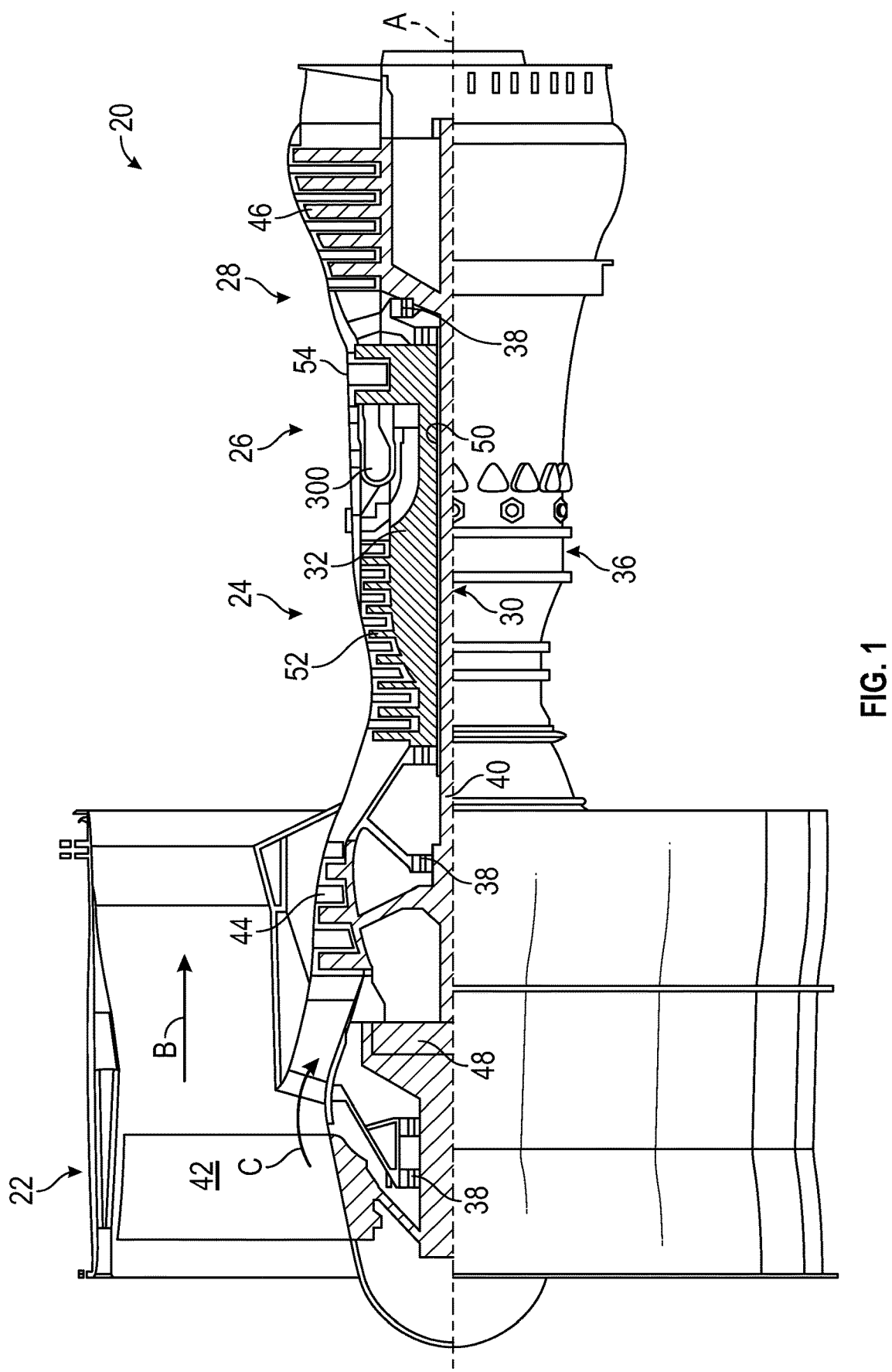
FIG. 1 is a partial cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
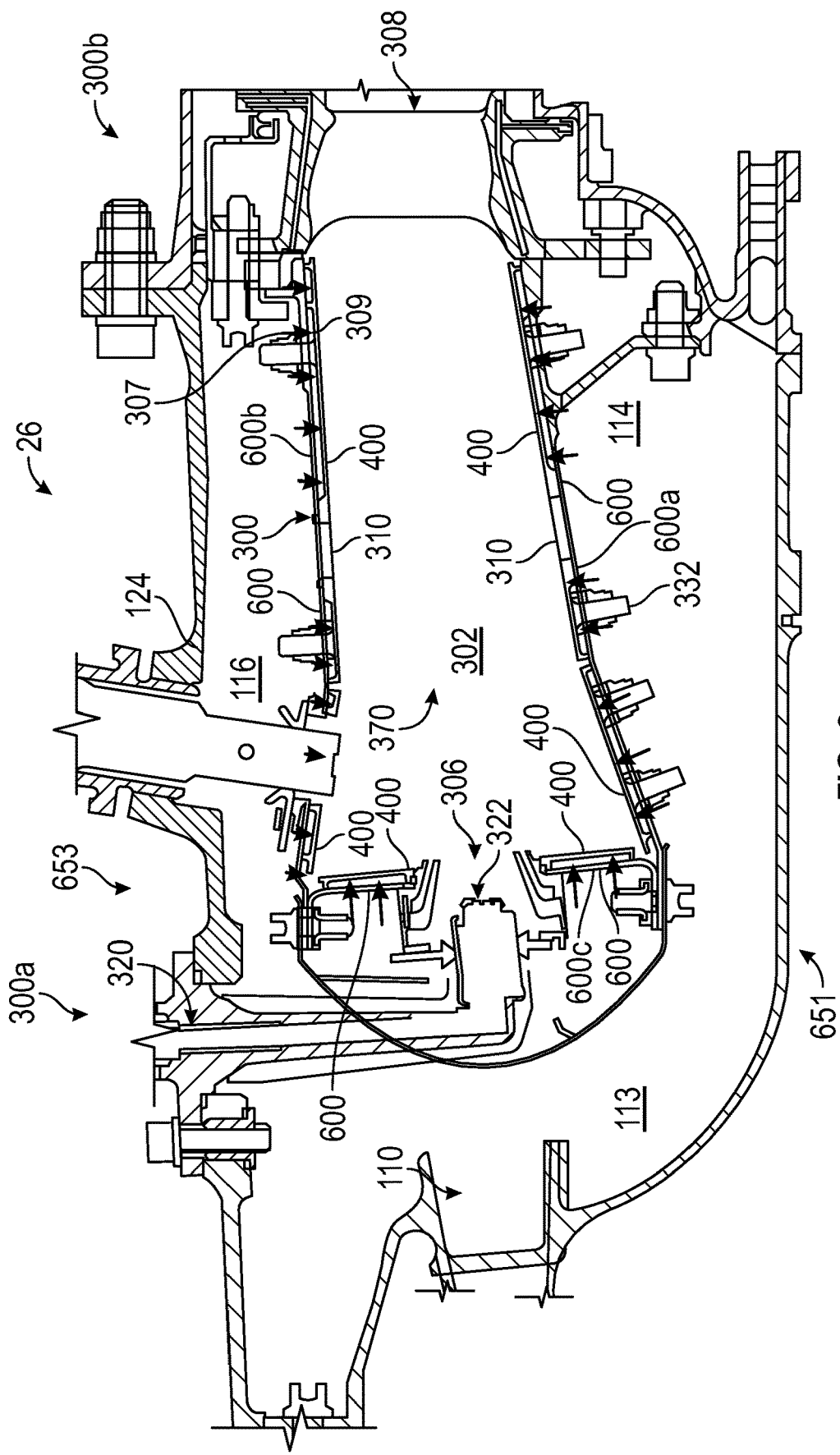
FIG. 2 is a cross-sectional illustration of a combustor.

Referring now to FIG. 2, with continued reference to FIG. 1, the combustor section 26 of the gas turbine engine 20 is shown. The combustor 300 of FIG. 2 is an impingement film float wall combustor. It is understood that while an impingement film float wall combustor is utilized for exemplary illustration, the embodiments disclosed herein may be applicable to other types of combustors for gas turbine engines including but not limited to double pass liner combustors, float wall combustors, and combustors with single wall liners.

As illustrated, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion chamber 302 through other holes in the combustor 300 including but not limited to quench holes 310, as seen in FIG. 2.

Compressor air is supplied from the compressor section 24 into a pre-diffuser 110, which then directs the airflow toward the combustor 300. The combustor 300 and the pre-diffuser 110 are separated by a dump region 113 from which the flow separates into an inner shroud 114 and an outer shroud 116. As air enters the dump region 113, a portion of the air may flow into the combustor inlet 306, a portion may flow into the inner shroud 114, and a portion may flow into the outer shroud 116.

Figure 3:
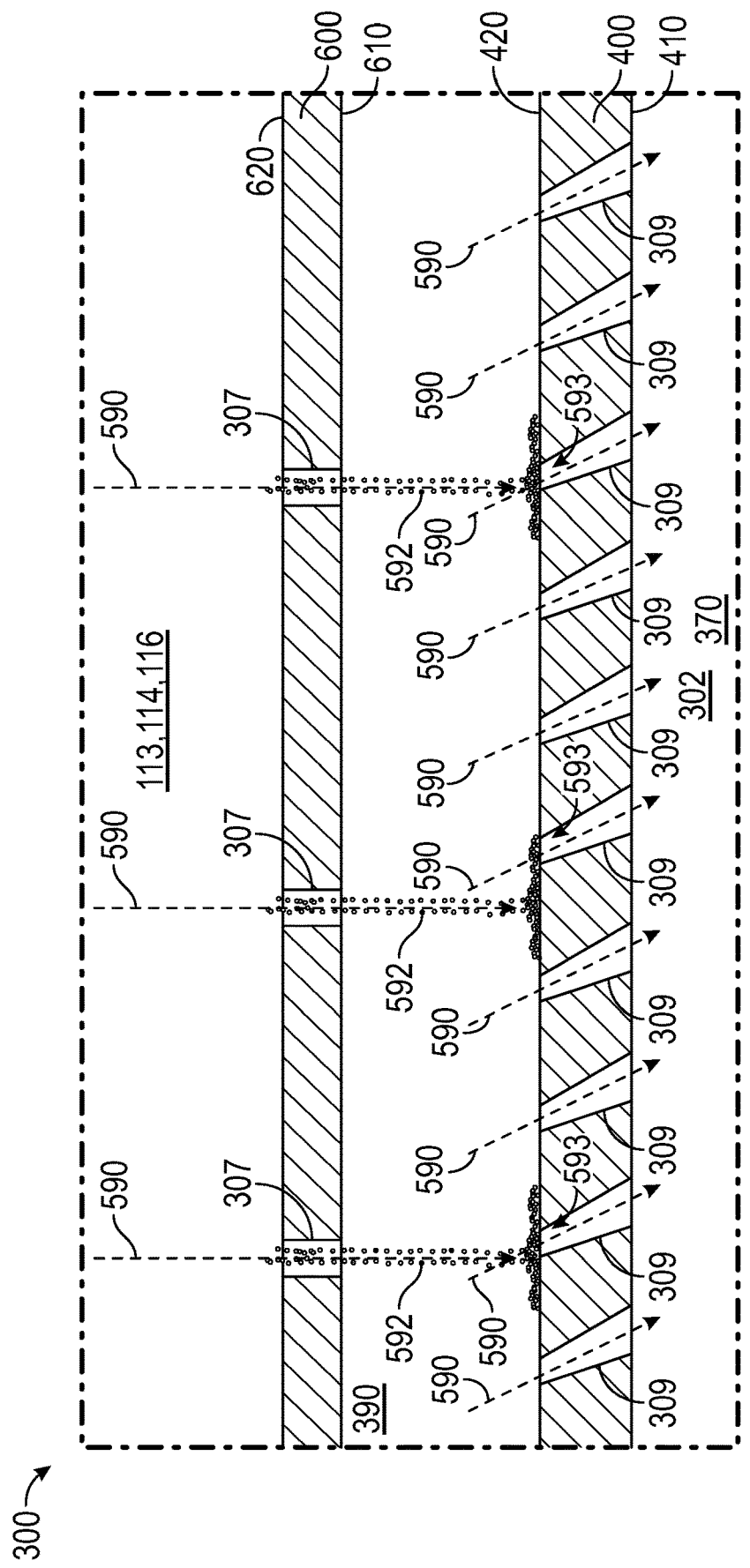
FIG. 3 is an enlarged view of a combustor shell and a heat shield panel for use in a combustor of a gas turbine engine.

The air from the inner shroud 114 and the outer shroud 116 may then enter the combustion chamber 302 by means of one or more impingement apertures 307 in the combustor shell 600 and one or more effusion apertures 309 in the heat shield panel 400, as shown in FIGS. 2 and 3. The impingement apertures 307 and effusion apertures 309 may include nozzles, holes, etc. The air may then exit the combustion chamber 302 through the combustor outlet 308. At the same time, fuel may be injected into the combustion chamber 302 through the primary and/or secondary orifices of a fuel injector 320 and a pilot nozzle 322, which may be atomized and mixed with air, and then ignited and burned within the combustion chamber 302. The diffuser case 124 defines the inner shroud 114 and the outer shroud 116. The combustor 300 is housed within the diffuser case 124 between the inner shroud 114 and the outer shroud 116.

The combustor 300, as shown in FIG. 2, includes multiple heat shield panels 400 that are attached to one or more combustor shells 600 (See FIG. 3). The heat shield panels 400 may be arranged parallel to the combustor shell 600. The combustor shell 600 includes a radially inward combustor shell 600a and a radially outward combustor shell 600b defined the combustion chamber 302 therebetween. The combustor shell 600 also includes a forward combustor shell 600c extending between the radially inward combustor shell 600a and the radially outward combustor shell 600b. The forward combustor shell 600c further bounds the combustion chamber 302 on a forward end 300a of the combustor 300. The radially inward combustor shell 600a and the radially outward combustor shell 600b extend circumferentially around the longitudinal engine axis A. The radially inward combustor shell 600a is located radially inward from the radially outward combustor shell 600b.

The heat shield panels 400 can be removably mounted to the combustor shell 600 by one or more attachment mechanisms 332. In some embodiments, the attachment mechanism 332 may be integrally formed with a respective heat shield panel 400, although other configurations are possible. In some embodiments, the attachment mechanism 332 may be a threaded mounting stud or other structure that may extend from the respective heat shield panel 400 through the interior surface to a receiving portion or aperture of the combustor shell 600 such that the heat shield panel 400 may be attached to the combustor shell 600 and held in place. The heat shield panels 400 partially enclose a combustion area 370 within the combustion chamber 302 of the combustor 300.

Referring now to FIG. 3, with continued reference to FIGS. 1 and 2, a heat shield panel 400 and combustor shell 600 of the combustor 300 (see FIG. 2) that may be used within the gas turbine engine 20 (see FIG. 1). Combustors 300 of gas turbine engines 20, as well as other components, experience elevated heat levels during operation. Impingement and convective cooling of heat shield panels 400 of the combustor 300 may be used to help cool the combustor 300. Convective cooling may be achieved by air that is channeled between the heat shield panels 400 and a combustor shell 600 of the combustor 300. Impingement cooling may be a process of directing relatively cool air from a location exterior to the combustor 300 toward a back or underside of the heat shield panels 400.

Thus, heat shield panels 400 are utilized to face the hot products of combustion within a combustion chamber 302 and protect the combustor shell 600 of the combustor 300. The heat shield panels 400 may be supplied with cooling air through the impingement apertures 307 and other dilution passages which deliver a high volume of cooling air into a hot flow path. The cooling air may be air from the compressor of the gas turbine engine 20. The cooling air may impinge upon a back side (i.e., second surface 420) of the heat shield panel 400 that faces the combustor shell 600 inside the combustor 300. The cooling air may contain particulates, which may build up on the heat shield panels 400 overtime, thus reducing the cooling ability of the cooling air. Embodiments disclosed herein seek to address particulate adherence to the heat shield panels 400 in order to maintain the cooling ability of the cooling air.

The heat shield panel 400 and the combustor shell 600 are in a facing spaced relationship. The heat shield panel 400 includes a first surface 410 oriented towards the combustion area 370 of the combustion chamber 302 and a second surface 420 opposite the first surface 410 oriented towards the combustor shell 600. The combustor shell 600 has an inner surface 610 and an outer surface 620 opposite the inner surface 610. The inner surface 610 is oriented toward the heat shield panel 400. The outer surface 620 is oriented outward from the combustor 300 proximate the inner shroud 114 and the outer shroud 116.

Figure 5:
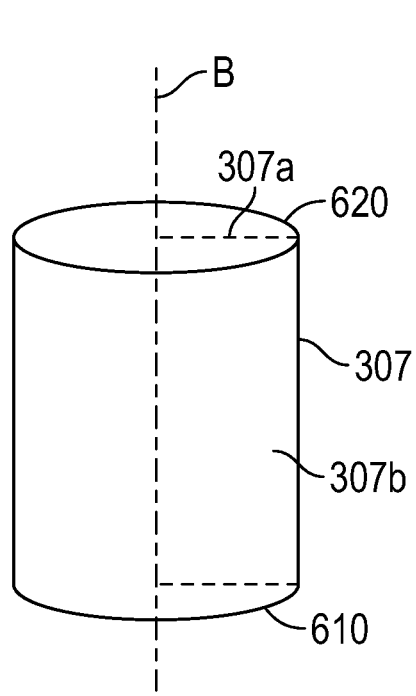
FIG. 5 is an enlarged view of an impingement aperture having an axisymmetric shape.

The combustor shell 600 includes a plurality of impingement apertures 307 configured to allow airflow 590 from the inner shroud 114 and the outer shroud 116 to enter an impingement cavity 390 located between the combustor shell 600 and the heat shield panel 400. Each of the impingement apertures 307 extend from the outer surface 620 to the inner surface 610 through the combustor shell 600. Each of the impingement apertures 307 fluidly connects the impingement cavity 390 to at least one of the inner shroud 114 and the outer shroud 116. Conventionally, these impingement apertures 307 have been circular in shape (see. FIG. 5).

The heat shield panel 400 may include one or more effusion apertures 309 configured to allow airflow 590 from the impingement cavity 390 to the combustion area 370 of the combustion chamber 302. Each of the effusion apertures 309 extend from the second surface 420 to the first surface 410 through the heat shield panel 400. Airflow 590 flowing into the impingement cavity 390 impinges on the second surface 420 of the heat shield panel 400 and absorbs heat from the heat shield panel 400.

As seen in FIG. 3, particulate 592 may accompany the airflow 590 flowing into the impingement cavity 390. Particulate 592 may include but is not limited to dirt, smoke, soot, volcanic ash, or similar airborne particulate known to one of skill in the art. As the airflow 590 and particulate 592 impinge upon the second surface 420 of the heat shield panel 400, the particulate 592 may begin to collect on the second surface 420, as seen in FIG. 3. Particulate 592 collecting upon the second surface 420 of the heat shield panel 400 reduces the cooling efficiency of airflow 590 impinging upon the second surface 420 and thus may increase local temperatures of the heat shield panel 400 and the combustor shell 600. Particulate 592 collection upon the second surface 420 of the heat shield panel 400 may potentially create a blockage 593 to the effusion apertures 309 in the heat shield panels 400, thus reducing airflow 590 into the combustion area 370 of the combustion chamber 302. The blockage 593 may be a partial blockage or a full blockage.

Embodiments disclosed herein seek to reduce the amount of particulate adhering the second surface 420 of the heat shield panel 400 by adjusting the shape of the impingement apertures 307 to disturb vorticities that are conventionally generated by impingement apertures 307 that are circular in shape, which helps better disperse particulate 592.

Referring now to FIGS. 4-10, with continued reference to FIGS. 1-3, a heat shield panel 400 and a combustor shell 600 of the combustor 300, are illustrated in accordance with an embodiment of the present disclosure. The combustor shell 600 of FIG. 4 comprises one or more impingement apertures 307 that have nonaxisymmetric shapes (i.e., not axisymmetric in shape). Axisymmetric may be defined as being symmetric about an axis and thus nonaxisymmetric may be defined as not symmetric about an axis or in other words not axisymmetric.

FIG. 5 illustrates an impingement aperture 307 that is axisymmetric in shape. The impingement aperture 307 of FIG. 5 is circular in shape and is axisymmetric about a longitudinal axis B of the impingement apertures 307. FIG. 5 illustrates that the impingement aperture 307 is axisymmetric in shape because a single plane 307a may be rotated 360 degrees around the longitudinal axis B to form the axisymmetric shape. This differs from an impingement aperture 307 that is nonaxisymmetric in shape (as in FIGS. 4 and 6-8) because the nonaxisymmetric shape cannot be formed by a single plane 307a rotated 360 degrees around the longitudinal axis B.

Figure 4:
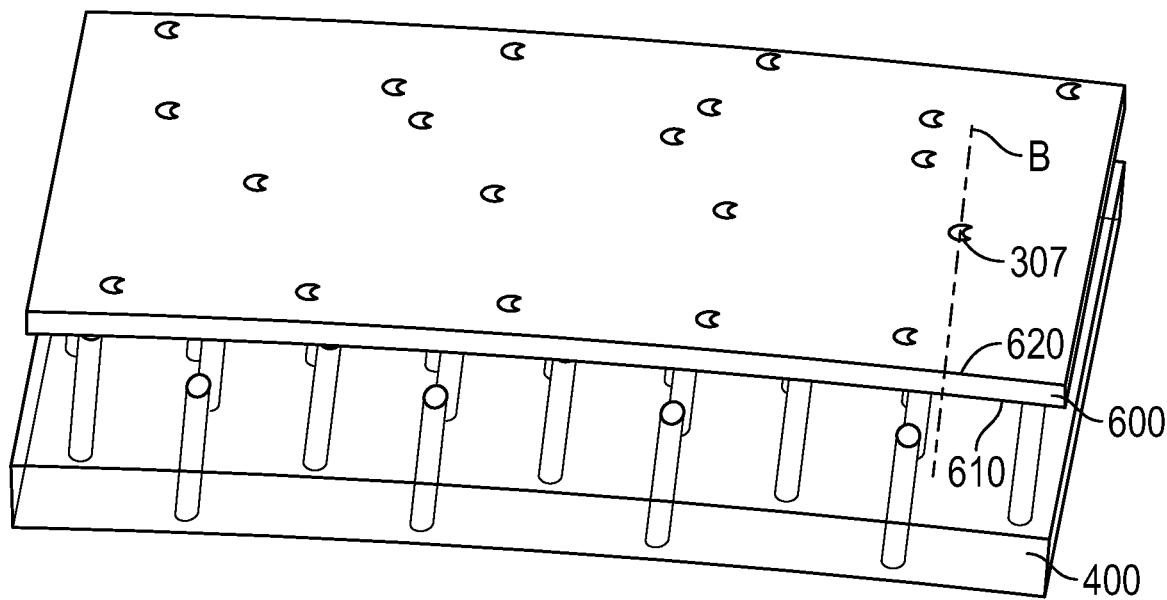
FIG. 4 is an enlarged view of a combustor shell with impingement apertures having a nonaxisymmetric shape and a heat shield panel for use in a combustor of a gas turbine engine, in accordance with an embodiment of the present disclosure.

The impingement aperture 307 of FIG. 4 is crescent-shaped and is nonaxisymmetric about a longitudinal axis B of the impingement aperture 307. The impingement aperture 307 extends from the outer surface 620 to the inner surface 610 through the combustor shell 600. In an embodiment, the nonaxisymmetric shape of the impingement aperture 307 extends from the outer surface 620 to the inner surface 610 through the combustor shell 600.

Figure 6:
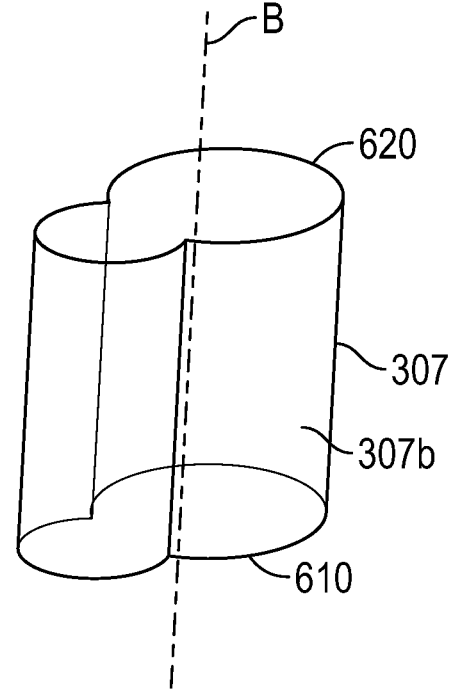
FIG. 6 is an enlarged view of an impingement aperture having a nonaxisymmetric shape, in accordance with an embodiment of the present disclosure.
Figure 7:
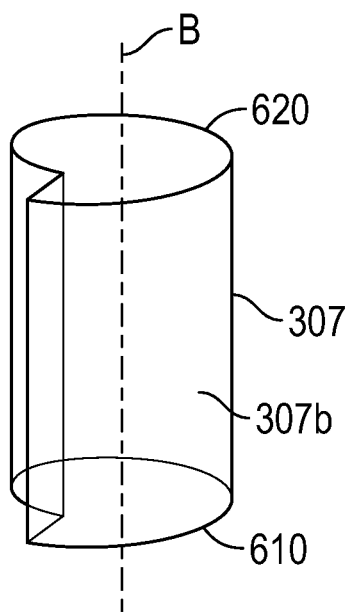
FIG. 7 is an enlarged view of an impingement aperture having a nonaxisymmetric shape, in accordance with an embodiment of the present disclosure.
Figure 8:
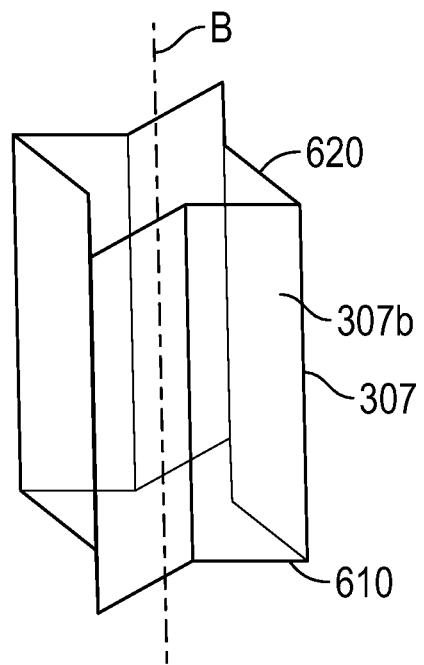
FIG. 8 is an enlarged view of an impingement aperture having a nonaxisymmetric shape, in accordance with an embodiment of the present disclosure.
Figure 9:
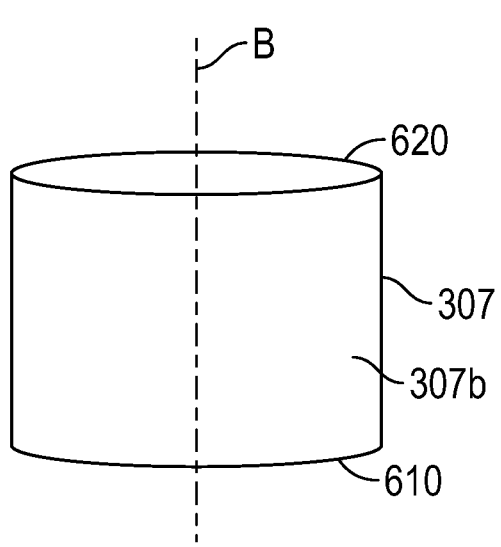
FIG. 9 is an enlarged view of an impingement aperture having a nonaxisymmetric shape, in accordance with an embodiment of the present disclosure.

An impingement aperture 307 that is nonaxisymmetric in shape may have two or more walls 307b that form the impingement aperture 307 by extending from the outer surface 620 to the inner surface 610 through the combustor shell 600 (see FIGS. 6-8). An impingement aperture 307 that is axisymmetric in shape typically only has one wall 307b that forms the impingement aperture 307 by extending from the outer surface 620 to the inner surface 610 through the combustor shell 600 (see FIG. 5). An impingement aperture 307 that is nonaxisymmetric in shape may also have only one wall 307b that forms the impingement aperture 307 by extending from the outer surface 620 to the inner surface 610 through the combustor shell 600. For example, an impingement aperture 307 that is nonaxisymmetric in shape and only has one wall 307b may be oval-shaped, as illustrated in FIG. 9. In an embodiment, the impingement aperture 307 is oval-shaped.

While the impingement apertures 307 of FIG. 4 are crescent-shaped, it is understood that the impingement apertures 307 may have any other nonaxisymmetric shapes. Some other examples of nonaxisymmetric shapes are illustrated in FIGS. 6-10.

Figure 10:
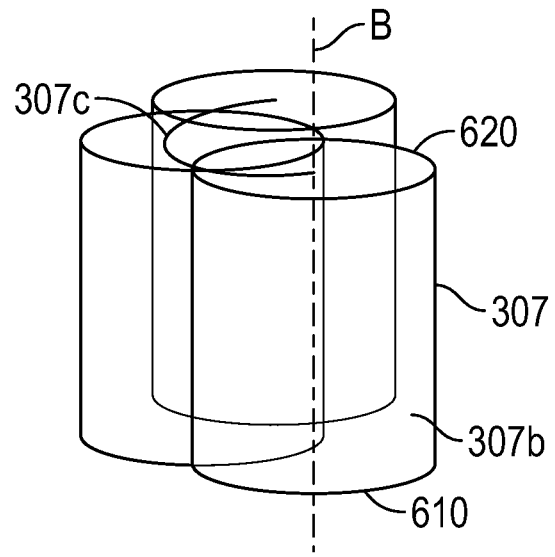
FIG. 10 is an enlarged view of an impingement aperture having a nonaxisymmetric shape, in accordance with an embodiment of the present disclosure.

An impingement aperture 307 that is nonaxisymmetric in shape may be formed by combining various intersecting shapes (e.g., FIGS. 6, and 10). In an embodiment, a shape of the impingement aperture 307 is composed of two or more intersecting shapes, as illustrated in FIGS. 6 and 10. The two or more intersecting shapes may be circles or any other shape. Additionally, a shape of the impingement aperture 307 may also be composed of two or more intersecting shape shapes that are different, such as, for example, a circle and a square. The two-or more shapes may be in aligned in an arc 307c. For example, the crescent-shape may be formed by three intersecting circles in an arc 307c, as illustrated in FIG. 10. The impingement aperture 307 of FIG. 6 has a shape of two intersecting circles and is nonaxisymmetric about a longitudinal axis B of the impingement aperture 307. It is understood that while the two intersecting circles are different sizes in FIG. 6, the two intersecting circles may also be the same size.

Advantageously, manufacturing is eased when the nonaxisymetric shape is formed by intersecting circles. The nonaxisymetric shape may be formed by various manufacturing methods, including but not limited to laser drilling or a water jet.

The impingement aperture 307 of FIG. 7 is comma-shaped and is nonaxisymmetric about a longitudinal axis B of the impingement aperture 307. In an embodiment, the impingement aperture 307 is comma-shaped. The impingement aperture 307 of FIG. 8 is star-shaped and is nonaxisymmetric about a longitudinal axis B of the impingement aperture 307. In an embodiment, the impingement aperture 307 is star-shaped. It is understood that while the star-shape of the impingement aperture 307 of FIG. 8 is a four-point star, the star-shape may have any number of points. The impingement aperture 307 of FIG. 9 is oval-shaped and is nonaxisymmetric about a longitudinal axis B of the impingement aperture 307. In an embodiment, the impingement aperture 307 is oval-shaped.

The impingement aperture 307 of FIG. 10 is arc-shaped and is nonaxisymmetric about a longitudinal axis B of the impingement aperture 307. In an embodiment, the impingement aperture 307 is arc-shaped. The arc shape of FIG. 10 is formed by three-intersecting shapes aligned in an arc 307c. In an embodiment, the arc shape of FIG. 10 is formed by three-intersecting circles aligned in an arc 307c.

Impingement apertures 307 that are axisymmetric in shape direct air in an impingement jet in the form of circular vortex rings towards the second surface 420 of the heat shield panel 400 for impingement cooling. These vortices concentrate particulate near the second surface 420 of the heat shield panel 400 and in particular near a stagnation region of the impingement jet where particulate can agglomerate due to small local velocities along surface. This may inadvertently lead to build up of particulate 592 on the second surface 420 of the heat shield panel 400 (see FIG. 3). Advantageously, by utilizing impingement apertures 307 that are nonaxisymmetric in shape, the vortices that are formed break up rapidly and the cooling airflow 590 hits the second surface 420 of the heat shield panel 400 in a non-uniform or variable manor, thus particulate 592 is dispersed better on the second surface 420 of the heat shield panel 400 by dispersing in non-uniform or variable manor.

Technical effects of embodiments of the present disclosure include shaping impingement apertures of combustor lines in an nonaxisymmetric shape to eliminate consistent vortices from the impingement apertures and promote dispersion of particulate.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A combustor for use in a gas turbine engine, the combustor comprises:

a heat shield panel having a first surface and a second surface opposite the first surface of the heat shield panel, the heat shield panel having a plurality of effusion apertures extending from the second surface to the first surface; and a combustor shell having an inner surface and an outer surface opposite the inner surface, the inner surface of the combustor shell and the second surface of the heat shield panel being in a facing spaced relationship defining an impingement cavity therebetween, wherein the combustor shell further comprises a plurality of impingement apertures each of the plurality of impingement apertures having a nonaxisymmetric shape that has a comma shape, the comma shape being defined by one curved wall and one linear wall, the one linear wall extending from a first end of the one curved wall to a second end of the one curved wall, and wherein each of the plurality of impingement apertures perpendicularly extend from the outer surface to the inner surface through the combustor shell and each of the plurality of impingement apertures are configured to disperse particulate on the second surface of the heat shield panel.

2. A gas turbine engine, comprising:

a combustor section; and a combustor housed within the combustor section, the combustor comprising:

a heat shield panel having a first surface and a second surface opposite the first surface of the heat shield panel, the heat shield panel having a plurality of effusion apertures extending from the second surface to the first surface; and a combustor shell having an inner surface and an outer surface opposite the inner surface, the inner surface of the combustor shell and the second surface of the heat shield panel being in a facing spaced relationship defining an impingement cavity therebetween, wherein the combustor shell further comprises a plurality of impingement apertures that each have a nonaxisymmetric shape that has a comma shape, the comma shape being defined by one curved wall and one linear wall, the one linear wall extending from a first end of the one curved wall to a second end of the one curved wall, wherein each of the plurality of impingement apertures perpendicularly extend from the outer surface to the inner surface through the combustor shell, and each of the plurality of impingement apertures are configured to disperse particulate on the second surface of the heat shield panel.

* * * * *